Figure 1:
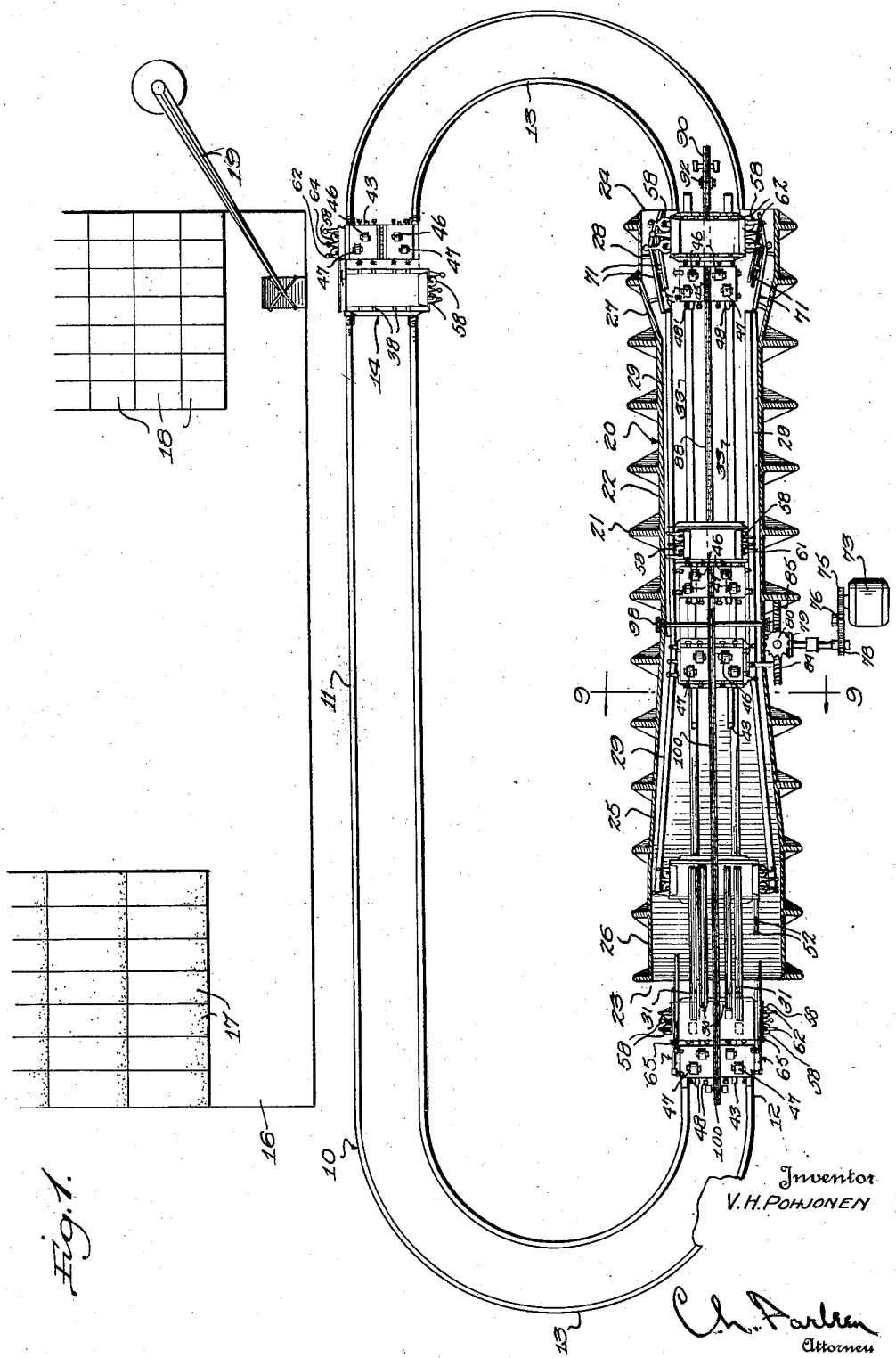

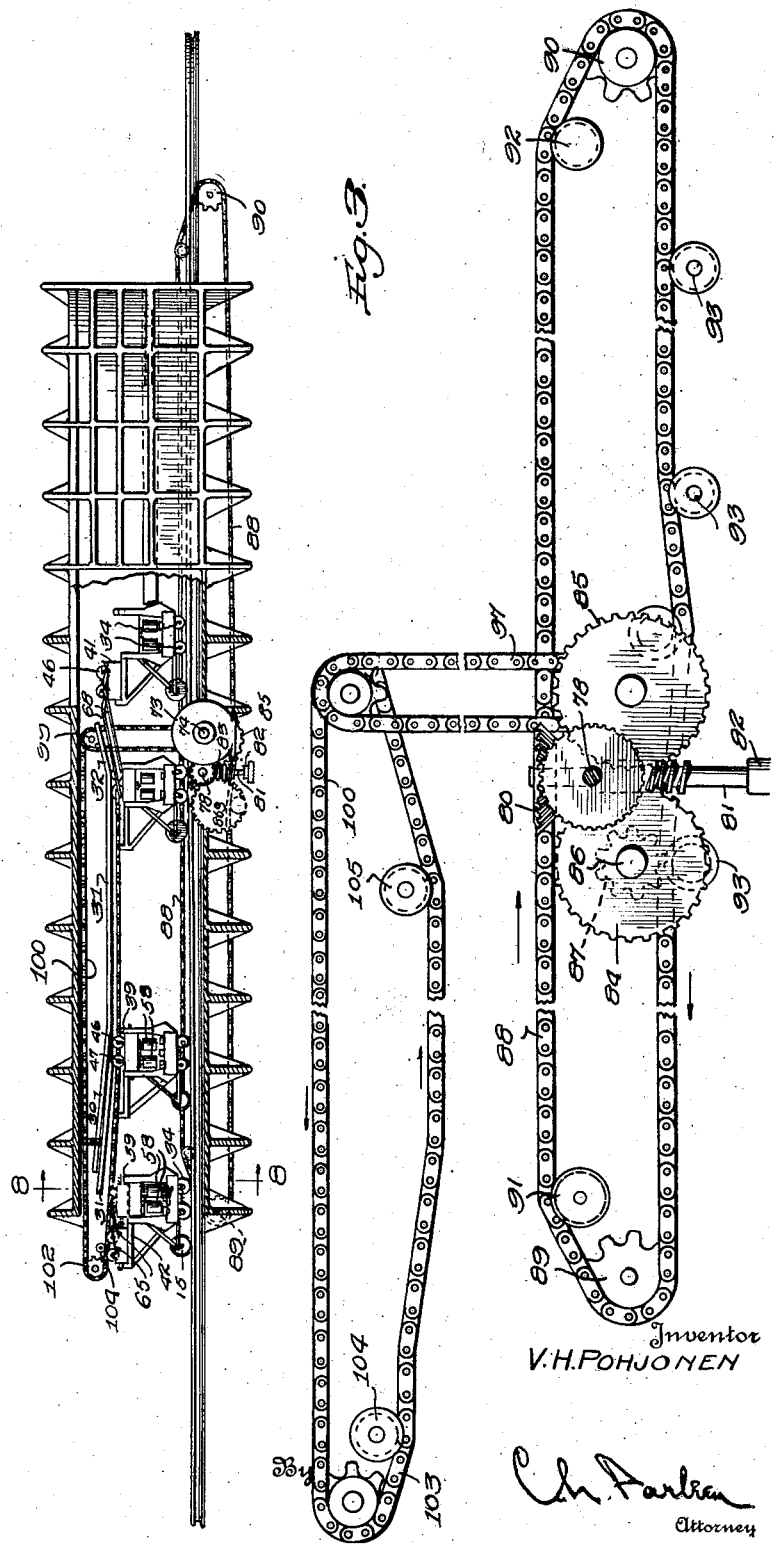

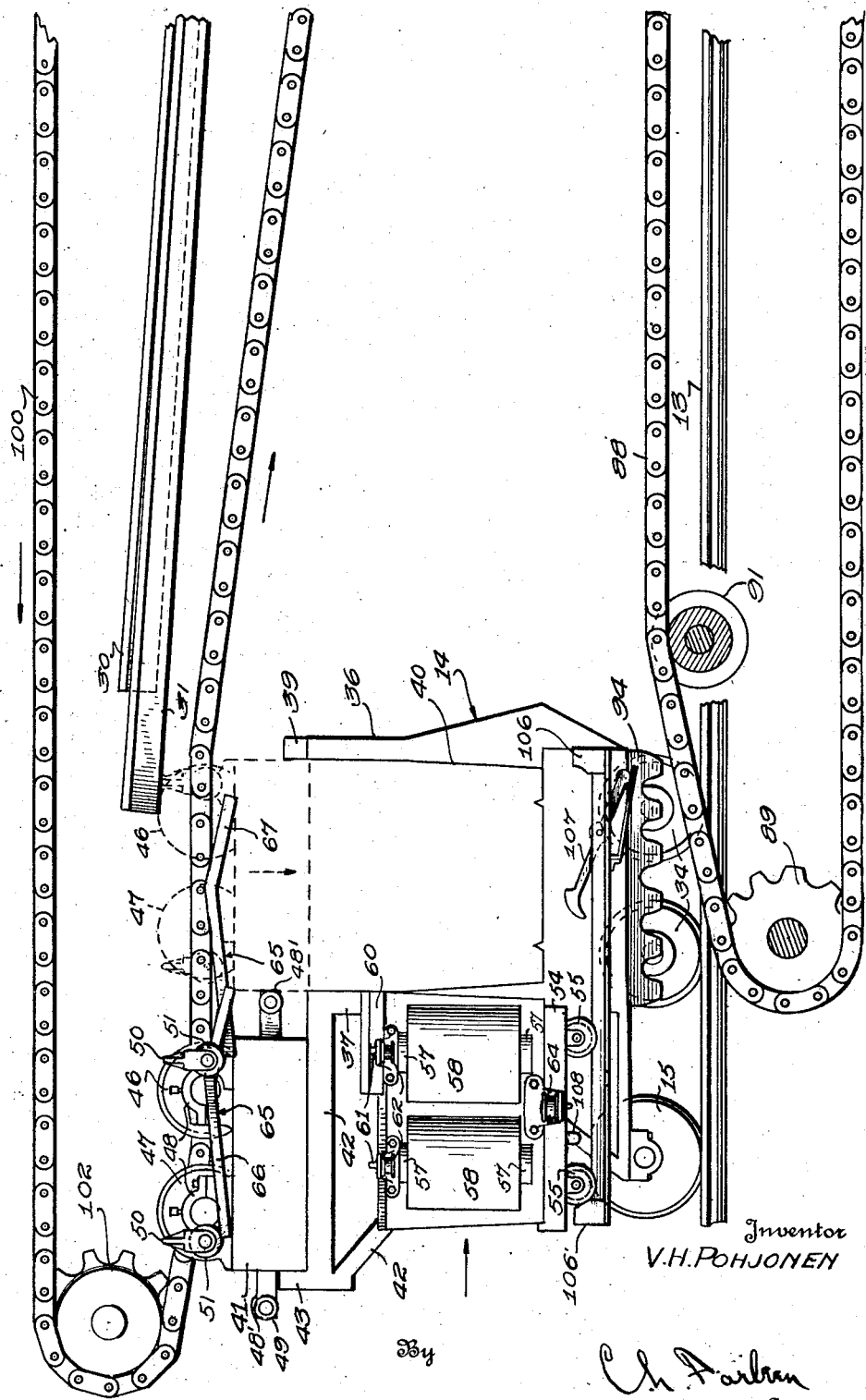

May 20, 1930.  V. H. POHJONEN  1,758,970
BALING PRESS
Filed Sept. 14, 1927  10 Sheets-Sheet 4
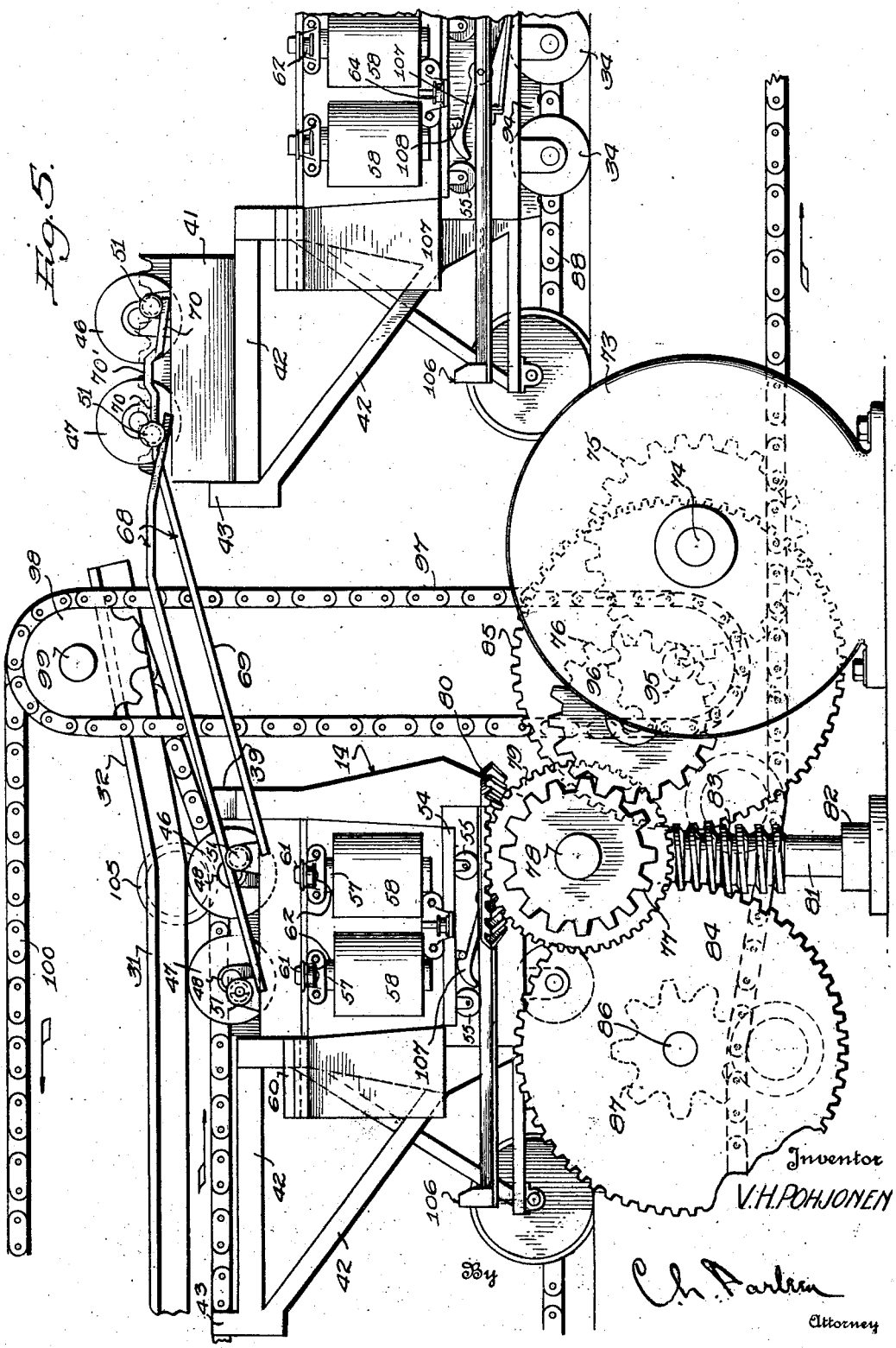
Inventor
V. H. POHJONEN
By
Attorney

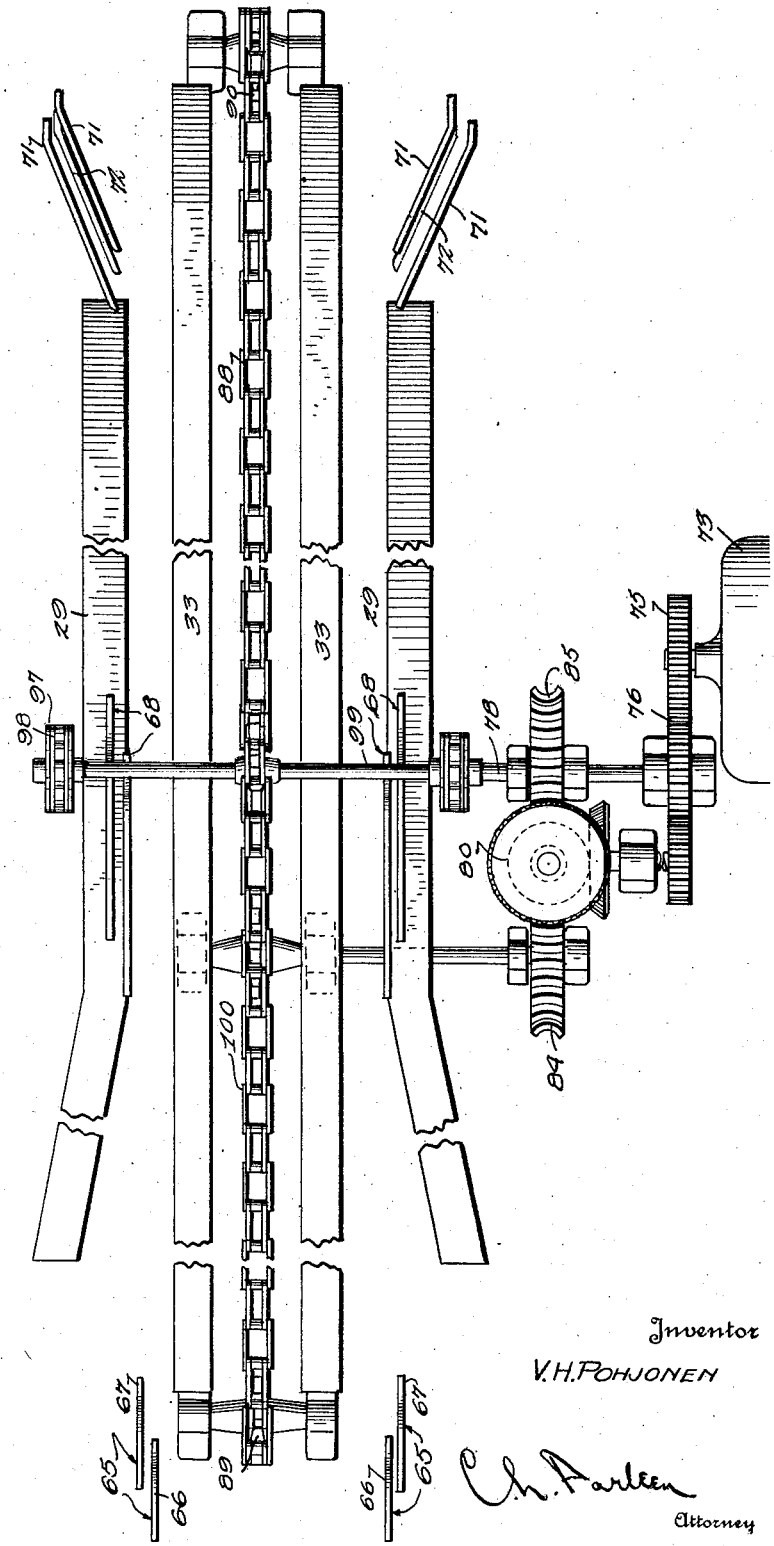

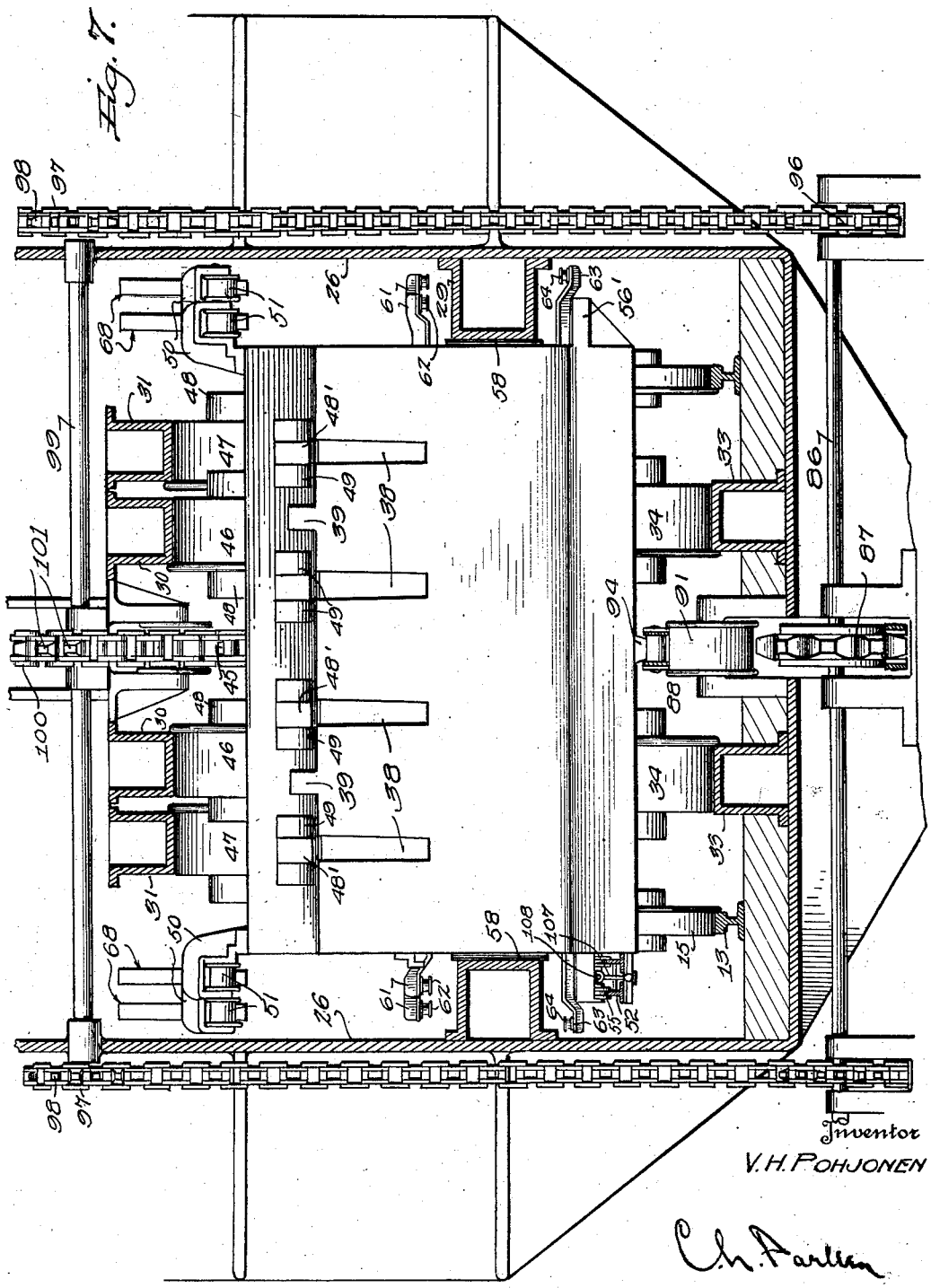

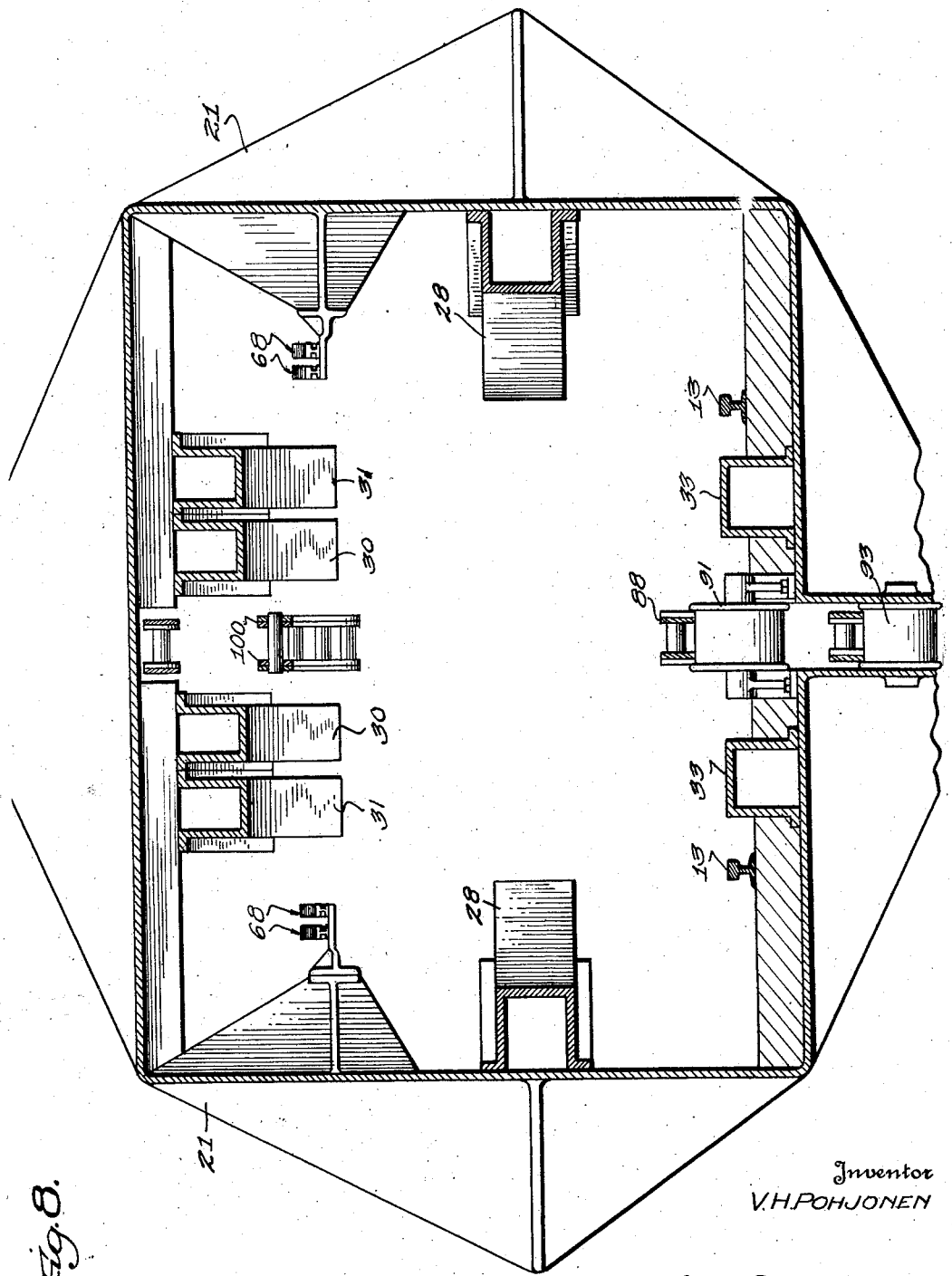

May 20, 1930.　　　V. H. POHJONEN　　　1,758,970
BALING PRESS
Filed Sept. 14, 1927　　　10 Sheets-Sheet 8

Inventor
V.H. POHJONEN

By
Attorney

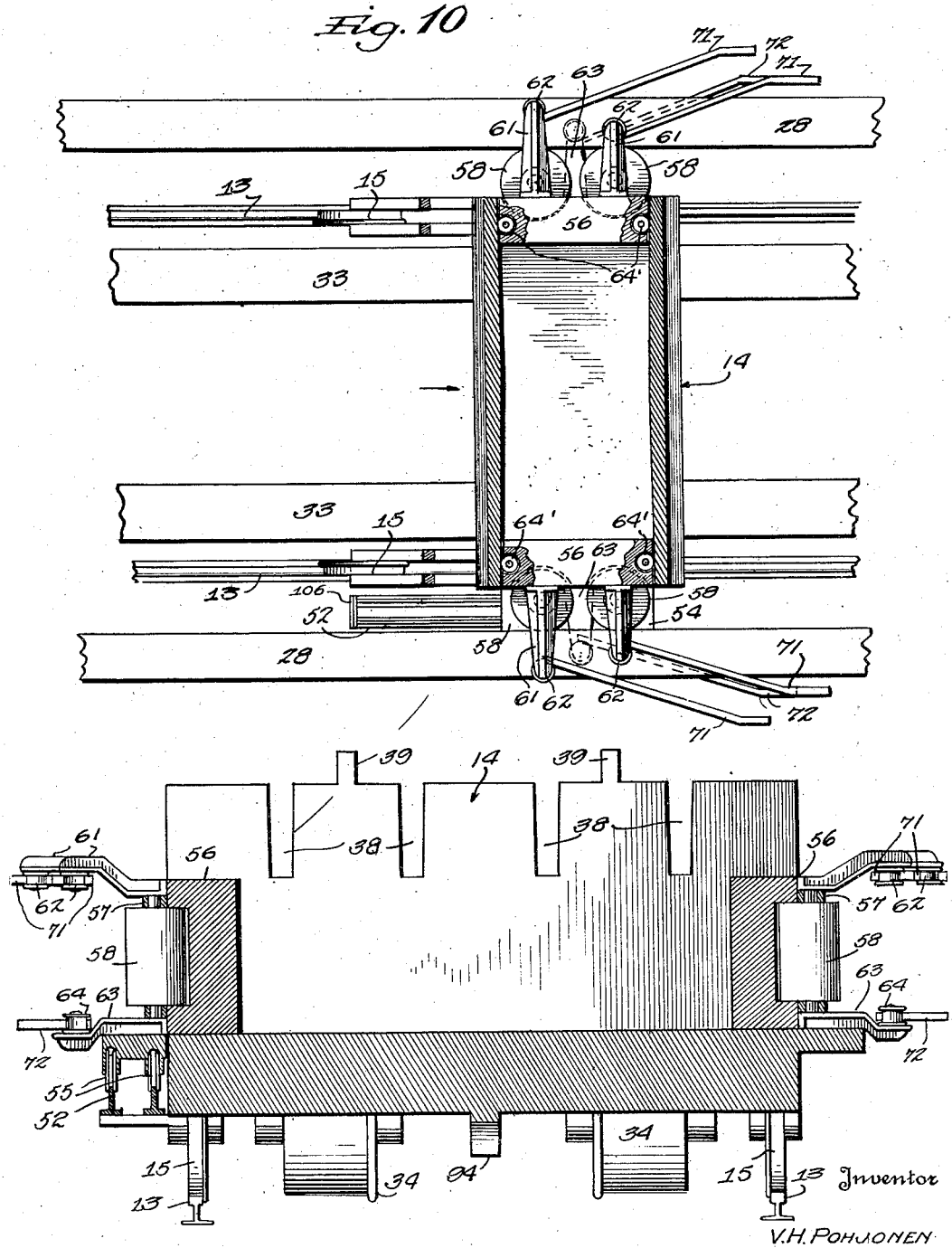

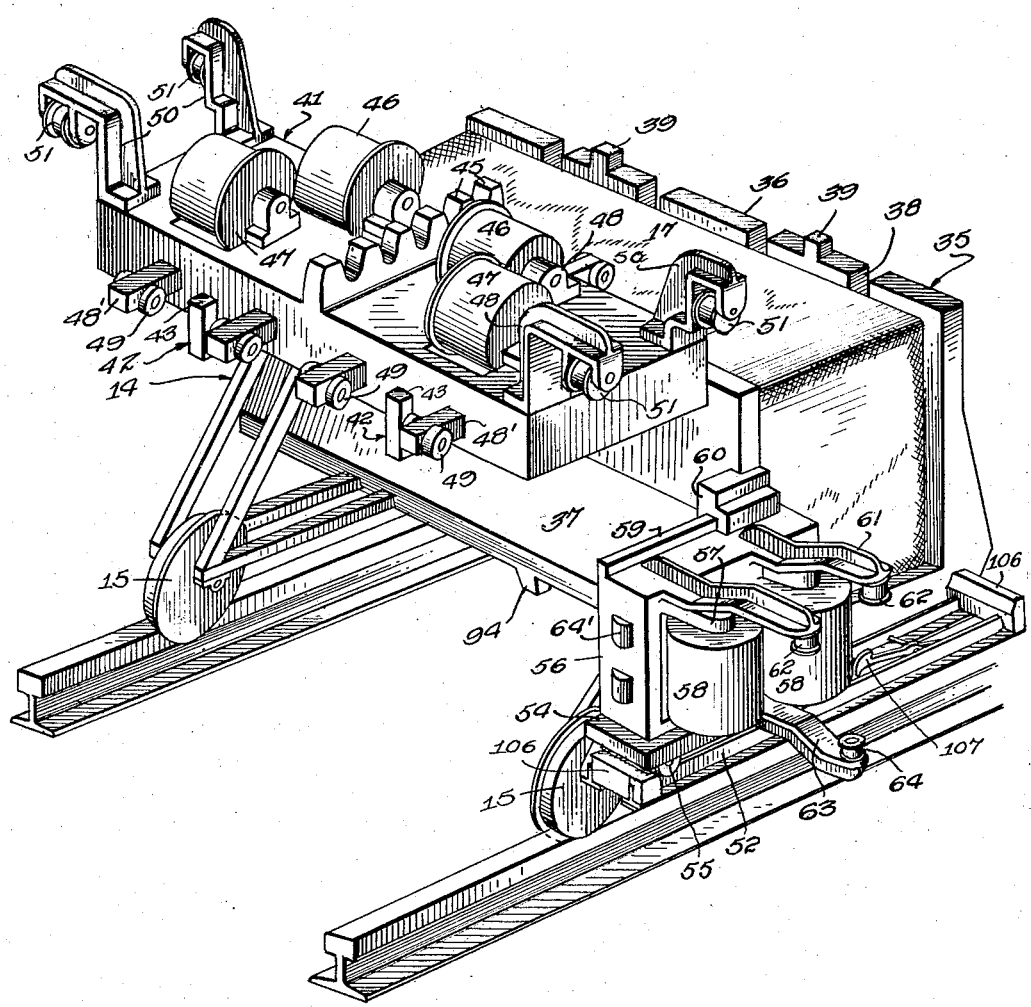

Patented May 20, 1930

1,758,970

UNITED STATES PATENT OFFICE

VÄINÖ HERMAN POHJONEN, OF PORI, FINLAND

BALING PRESS

Application filed September 14, 1927. Serial No. 219,525.

This invention relates to baling presses.

An important object of the invention is to provide a continuously operating baling press whereby successive bales of cotton or other material continuously may be discharged from the outlet end of the apparatus.

A further object is to provide an apparatus particularly adapted for baling cotton and the like wherein successive plantation bales may be fed into one end of the apparatus and discharged from the opposite end thereof in the form of completed bales.

A further object is to provide an open ended tunnel having means associated therewith for continuously compressing plantation or similar bales fed into one end thereof.

A further object is to provide an apparatus of the above mentioned character wherein a carriage is movable through the tunnel, the carriage being provided with a bale receiving portion and compressing members associated therewith, said compressing members being adapted to coact with means arranged within the tunnel for compressing the bale as the carriage moves therethrough.

A further object is to provide an apparatus of the above mentioned character wherein the carriage is provided with a substantially U-shaped body for receiving the unfinished bales, the body having an open top and open ends into which the compressing members are movable as the carriage travels through the tunnel.

A further object is to provide downwardly inclined rails arranged in the upper portion of the tunnel for effecting downward movement of the upper compression member and inwardly converging side rails for effecting inward movement of the end compression members whereby vertical and lateral compressing is effected as the carriage travels through the tunnel.

A further object is to provide novel actuating means for conveying the carriage through the tunnel.

A further object is to provide automatic means for moving the upper compression member into operative position as the carriage enters the inlet end of the tunnel.

A further object is to provide automatic means for retracting the compression members after the compression of each successive bale has been completed.

Other objects and advantages of the invention will be apparent during the course of the following description.

Figure 9:
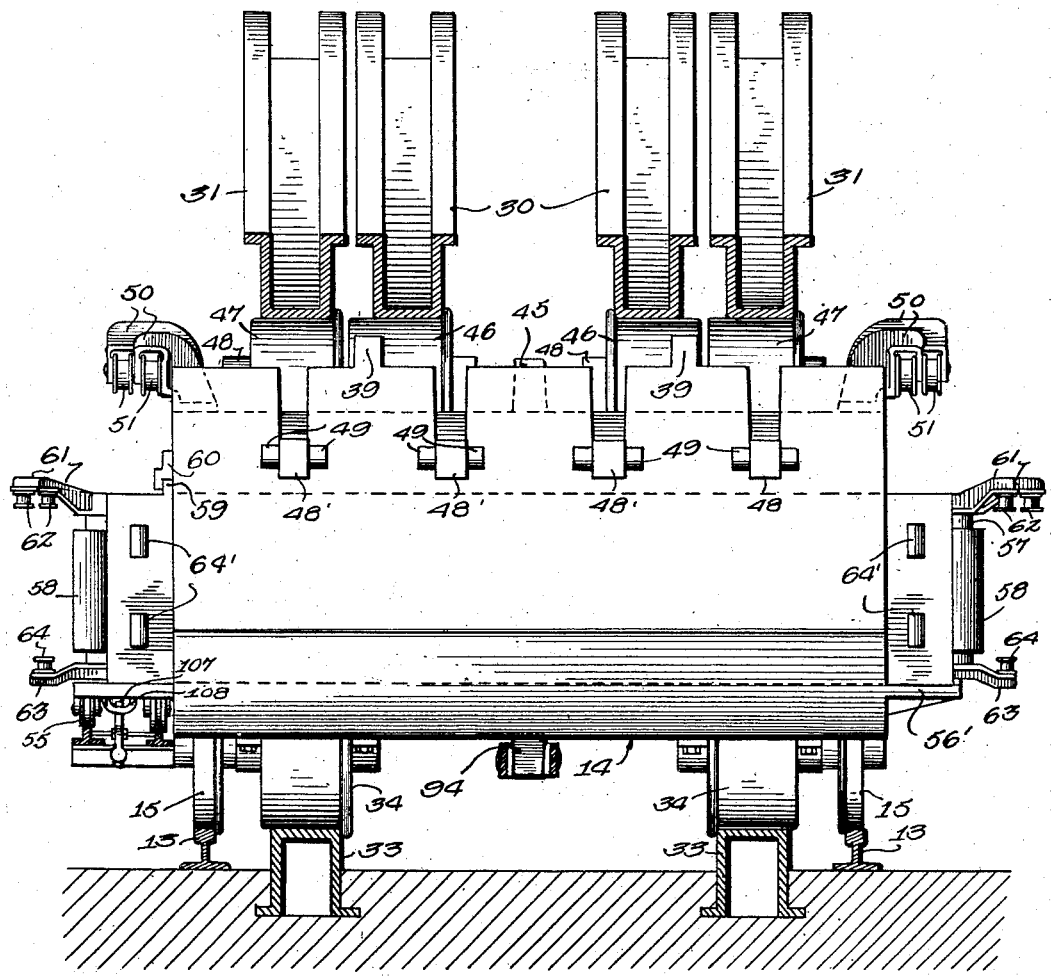

In the drawings I have shown one embodiment of the invention. In this showing,

Figure 1 is a plan view of the apparatus as a whole, parts being shown in section, Figure 2 is a side elevation of the baling apparatus, parts being broken away, Figure 3 is an enlarged fragmentary side elevation of a portion of the driving means, Figure 4 is an enlarged side elevation of one of the carriages and associated elements shown at the entrance end of the tunnel, Figure 5 is a similar view showing the carriage adjacent the outlet end of the tunnel, Figure 6 is a fragmentary plan view of portions of the apparatus associated with the tunnel, the latter being omitted, Figure 7 is a transverse sectional view through the tunnel adjacent and looking toward the inlet end thereof, Figure 8 is a section taken substantially on line 8—8 of Figure 2, Figure 9 is a section taken substantially on line 9—9 of Figure 1, parts being omitted, Figure 10 is a plan view of the carriage shown adjacent the outlet end of the tunnel, parts being omitted and parts being broken away, Figure 11 is a transverse sectional view through the carriage, and, Figure 12 is a perspective view of the carriage shown in position on the supporting rails.

Referring to the apparatus as a whole, as illustrated in Figure 1, the numeral 10 designates a trackway as a whole having opposite parallel portions 11 and 12 and curved ends 13. A carriage indicated as a whole by the numeral 14 is provided with wheels 15 whereby it is adapted to travel on the trackway. The straight portion 11 of the trackway is arranged adjacent a loading and unloading platform 16 upon which may be piled plantation bales of cotton or other semi-formed bales of material as indicated at 17. Finished bales 18 may be piled on the platform, and a crane or the like 19 is adapted to lift finished bales from the carriage to the pile 18 as will become apparent. If desired, a similar crane may be employed for transferring the semi-finished bales 17 from the platform to the carriage. One of the straight portions 12 of the trackway is adapted to convey the carriage to a tunnel 20 in which the baling operation to be described is performed. The trackway may extend entirely through the tunnel as shown, or may terminate adjacent its ends, as will become apparent.

Referring to Figures 1, 2, 7 and 8, it will be noted that the tunnel 20 is relatively large and heavy and is formed of cast or structural metal. The tunnel is substantially rectangular in cross section and may be suitably reinforced by preferably integral ribs 21. If desired, the walls of the tunnel may be eliminated, in which case, the ribs 21 would constitute the tunnel. If a walled tunnel is employed, as shown in the drawings, the portion of the top of the tunnel extending from a point substantially centrally thereof to the outlet end is left open as shown in Figure 2, to permit operators to fasten bale bands in place, as will become apparent. One portion of the tunnel is arranged with the opposite sides thereof parallel as indicated at 22. The tunnel is provided with inlet and outlet ends 23 and 24 respectively, and from the parallel portion 22, the sides of the tunnel are flared outwardly as at 25. The side walls between the inlet end of the tunnel and the adjacent ends of the flared portions 25 are substantially parallel as indicated at 26. Near the outlet end of the tunnel, the side walls thereof diverge at a relatively sharp angle as indicated at 27, the extremities of these side walls being parallel as indicated at 28. It will be noted that the portions 25 of the side walls are relatively long and converge toward the center of the tunnel at a relatively small angle.

A pair of relatively heavy side rails 29 are arranged within the tunnel, the portions of the rails adjacent the inlet end of the tunnel converging toward the center of the tunnel and being arranged substantially parallel to the converging portions 25 of the side walls of the tunnel. The extremities of the converging portions of the rails are arranged a substantial distance inwardly of the inlet end of the tunnel as indicated in Figure 1. The portions of the side rails 29 toward the outlet end of the tunnel are arranged substantially parallel to each other, and the extremities of these portions of the rails 29 terminate inwardly of the outlet end of the tunnel. The converging portions of the side rails are adapted to effect lateral compression of the unfinished bales in a manner to be described. Vertical compression of the bales is adapted to be effected by overhead pairs of parallel rails 30 and 31 respectively. Referring to Figure 2, it will be noted that the rails 30 and 31, for a substantial distance intermediate their ends, are arranged in the same horizontal plane, while the ends of these rails are inclined toward the inlet end of the tunnel. The inclined portions of the rails 30 and 31 are arranged parallel to each other but in different planes, for a purpose to be described. The inner ends of the rails 30 and 31 are inclined upwardly for a short distance as shown at 32 (see Figure 5). For the purpose of providing additional rigid supporting means for the carriage as it passes through the tunnel, a pair of relatively heavy rails 33 are arranged in the bottom of the tunnel and are adapted to be engaged by relatively heavy auxiliary wheels 34 mounted beneath the carriage 14. These rails are substantially horizontal throughout their length, as will be apparent.

Referring to Figures 4 and 9 to 12 inclusive, it will be noted that the carriage includes a substantially U-shaped bale receiving member 35. As shown, this member includes side walls 36 and 37 each of which is provided with a plurality of vertical slots 38 for a purpose to be described. Bale bands may be arranged in the bale receiving member transversely thereof, before the semi-finished bale is placed in position. The wall 36 is also provided with a pair of upstanding stops 39, the purpose of which will be referred to later. It will be apparent that the bale receiving member is open at its top and ends as shown in Figure 12, and one of the unfinished bales 17 is adapted to be received therein. Any number of the carriages 14 may be employed, the carriages being successively conveyed through the tunnel whereby the operation of compressing the bales may be carried out continuously. The lower portions of the walls 36 and 37 diverge from their lower extremities to their central portions as indicated at 40 (see Figure 4) whereby the finished bales readily may be removed.

A vertical compressing member 41 is adapted to be moved downwardly into the upper portion of the bale receiving member to compress material therein in a manner to be described. As shown in Figures 4, 5 and 12, a support 42 is formed preferably integral with the wall 37 and extends rearwardly therefrom, and the compression member 41 is arranged on this support when in the inoperative position shown in Figure 4. Angular supports 42' may be arranged between the outer extremity of the support 42 and the lower portion of the wall 37. The outer extremity of the support 42 is provided with upstanding stop members 43 to limit the rearward movement of the compression member 41 when the latter is moved rearwardly to inoperative position.

The compression member 41 is relatively heavy as clearly shown in Figure 12, and is provided on its upper face with a rack 45 which may be formed integral therewith. The rack 45 is adapted to be engaged by means to be described to effect its movement to operative position over the bale receiving member. Forward and rear sets of wheels 46 and 47 are arranged over the compression member 41 and are journalled as at 48. It will be noted that the wheels 46 are arranged closer together than the wheels 47, and the sets of wheels are adapted to engage the rails 30 and 31 respectively. As the carriage moves into the inlet end of the tunnel, the wheels 46 are adapted to engage the rails 30 at the same time the wheels 47 engage the rails 31. The compression member 41 is provided with guide members 48' projecting from opposite edges thereof and rollers 49 are mounted at opposite edges of the guide members. The guide members 48' are adapted to move downwardly into the slots 38 as the compression member 41 is forced downwardly, and the rollers 49 are adapted to engage the outer faces of the walls 36 and 37 to reduce the friction incident to the downward movement of the compression member by maintaining the edges thereof spaced slightly from the inner edges of the walls 36 and 37, and also serve to reinforce the walls 36 and 37 to prevent spreading thereof while material is being compressed therebetween. Hangers 50 are secured to opposite ends of the compression member and are provided with rollers 51 adapted to engage means arranged within the tunnel, for purposes to be described.

A pair of rails 52 is arranged adjacent one side of the carriage near the lower portion thereof and is secured to the carriage by outwardly extending brackets 53. It will be apparent that these rails are adapted to travel with the carriage and the rails are adapted to support an auxiliary carriage 54, by means of small wheels 55 which engage the rails. The auxiliary carriage 54 is adapted to move forwardly and rearwardly with respect to the bale receiving member. A lateral compression member 56 is arranged adjacent each side of the bale receiving member and corresponds to the width between the walls thereof whereby it is adapted to move thereinto. One of the compression members 56, when moved outwardly from the bale receiving member is adapted to be arranged upon the auxiliary carriage 54, while the other member 56 slides outwardly upon a stationary support 56' as shown in Figures 7 and 9. Integral bearings 57 are carried by the lateral compression members, and heavy rollers 58 are mounted in the bearings 57 and are adapted to engage the heavy side rails 29 previously referred to. The compression member 56 which moves upon the carriage 54 may be provided at its upper and inner edge with an upwardly projecting guide flange 59 which is slidable in a guide 60 carried by the bale receiving member, as clearly shown in Figure 12. The member 60 is adapted to positively hold the corresponding lateral compression member in position on the auxiliary carriage to prevent it from tipping over when it is in the inoperative position shown in Figure 12. Each lateral compression member is provided with a pair of upper hangers 61 having rollers 62 mounted on their outer ends, while a similar lower hanger 63 projects outwardly from the lower end of each compression member 56 and is provided with a roller 64. The rollers 62 and 64 are adapted to engage means mounted within the tunnel for a purpose to be described. Anti-friction rollers 64' may be mounted in the ends of the lateral compression members, and these rollers are adapted to contact with the inner faces of the walls 36 and 37 when the compression members are moved inwardly to compress material in the member 35.

The forward hangers 50 are offset with respect to the rear hangers 50 and these hangers are adapted to engage stationary rails 65 mounted in the inlet end of the tunnel. Each of the rails 65 is provided with oppositely inclined portions 66 and 67 whereby the vertical compression member of each carriage is adapted to be lifted from the support 42 and conveyed to a position over the bale receiving member to be released for movement downwardly thereinto in a manner to be described. A somewhat similar set of rails 68 is arranged substantially centrally of the tunnel to lift the upper compression member of each carriage after the vertical and lateral compressing operation has been completed. Each rail 68 is provided with a relatively long slightly inclined portion 69 and an upper horizontal portion 70, as shown in Figure 5. The inclined portions of the rails are arranged parallel to each other and in different planes, for a purpose to be described. The rails 68 toward the outlet end of the machine may be provided with slightly elevated portions 70' beyond the horizontal portions of the rails, for a purpose to be described, and the extremities of the rails may be turned downwardly for a short distance, as shown.

Adjacent the outlet end of the tunnel, a pair of rails 71 is mounted adjacent opposite sides of the tunnel, and the inner end of each of these rails is arranged in the path of travel of one of the rollers 62, shown in Figure 12. The inner portions of the rails 71 diverge toward the outlet end of the tunnel, as clearly shown. A similar rail 72 is arranged below the rails 71 as shown in Figure 10. The rails 71 are adapted to engage the rollers 62, while the rails 72 are adapted to engage the rollers 64, to withdraw the lateral compression members from the bale receiving member.

Means are provided for conveying successive carriages through the tunnel. Referring to Figures 2, 3 and 5, the numeral 73 designates a motor having an armature shaft 74 upon which is mounted a gear 75. This gear meshes with an intermediate gear 76, and the latter gear drives a third gear 77 mounted upon a shaft 78. A bevel gear 79 is mounted on the shaft 78 and drives a bevel gear 80 mounted upon a vertical shaft 81 and supported in a thrust bearing 82. A worm 83 is carried by the shaft 81 and meshes with a pair of worm wheels 84 and 85 respectively.

The worm wheel 84 is mounted upon a shaft 86 which carries a sprocket 87, this sprocket being adapted to drive a lower chain 88, as shown in Figure 3. The chain 88 passes around sprockets 89 and 90 arranged adjacent opposite ends of the tunnel, as shown in Figure 2. The chain also passes over idler sprockets 91 and 92 arranged adjacent the inlet and outlet ends of the tunnel respectively. The lower run of the chain is supported by idler sprockets 93, one of which is preferably arranged beneath the shaft 86 to maintain the chain in engagement with the sprocket wheel 87. As shown in Figures 7, 9 and 11, a rack 94 is formed on the lower side of the carriage 14 and is adapted to be engaged by the upper run of the chain 88.

The worm wheel 85 is mounted upon a shaft 95, as shown in Figure 5, and a pair of sprocket wheels 96 are mounted on this shaft. Chains 97 pass over these sprockets and extend upwardly around upper sprockets 98 mounted upon a shaft 99. An upper chain 100 is adapted to be driven from the shaft 99 by a sprocket 101 mounted substantially centrally thereof as shown in Figure 7. It will be apparent that the shafts referred to may be journalled in suitable bearings, as suggested in Figure 7. The chain 100 extends rearwardly to a point substantially centrally of the tunnel as shown in Figures 1 and 2, and the forward end of this chain passes around a sprocket 102 arranged slightly beyond the inlet end of the tunnel. Rearwardly of the sprocket 103, the lower run of the chain 100 inclines downwardly at a slight angle as at 103 and passes around an idler 104. An idler 105 is arranged near the rear end of the chain 100, somewhat below the idler 104 and the lower run of the chain is adapted to pass around the idler 105. It will be apparent that the outer end of the lower run of the chain 100 is adapted to engage the rack 45 carried by the vertical compression member, and this engagement takes place before the lower rack 94 is engaged by the lower chain 88, for a purpose to be described.

As previously stated, the auxiliary carriage 54 is adapted to move forwardly and rearwardly and means may be provided for positively limiting this movement. Referring to Figure 12, the numeral 106 designates forward and rearward stops arranged adjacent the ends of the rails 52 and supported thereon. These stops are adapted to engage the wheels of the movable auxiliary carriage 54 to limit its movement. A pivoted stop 107 is adapted to engage a lug or similar member 108 carried by the movable auxiliary carriage 54 to lock it against rearward movement from operative position, and this stop may be depressed to permit the auxiliary carriage to be moved from its forward to its rearward position. The auxiliary carriage is shown in inoperative position in Figures 4 and 12, and operative position in Figures 5 and 10. When the carriage is in operative position, the lateral compression member is arranged in alinement with the bale receiving member, being positioned between the walls 36 and 37.

The operation of the apparatus is as follows:

It will be apparent that both of the lateral compression members 56 are movable into and out of the bale receiving member, and one of these members is movable away from the bale receiving member to the inoperative position shown in Figure 2. The vertical compression member also is adapted to assume an inoperative position as shown in Figure 12. With the compression members in the inoperative positions referred to, the carriage is moved to a position alongside the platform 16 adjacent the pile of plantation or similar bales 17. The compression member 56 which is adapted to be arranged on the auxiliary carriage is preferably arranged on the side of the carriage adjacent the platform 16, whereby the placing of a bale in the bale receiving member is facilitated. After the bale is placed in position, the auxiliary carriage 54 is manually moved to a position opposite the bale receiving member by rolling the wheels 55 along the rails 52, and the latch 107 engages the member 108 to maintain the auxiliary carriage in such position. The carriage then passes around the curve of the rails to a position ready to enter the inlet end of the tunnel. As the carriage is pushed or otherwise moved into the inlet end of the tunnel the lower run of the upper chain 100 engages the rack 45 of the vertical compression member, this engagement taking place at the slightly inclined portion 103 of the chain, shown in Figure 3. With the carriage remaining stationary, the chain 100 effects movement of the compression member 51 and initial movement of this member causes the small rollers 51 thereof to engage the upwardly inclined portions 66 of the rails 65. Continued inward movement of the compression member 41 by movement of the chain 100 causes the member 41 to be elevated clear of the support 42, as will be apparent. After the rollers 51 pass the high points of the rails 65, the member 41 will start to move downwardly and inwardly until the inner end of the compression member contacts with the stops 39. Continued movement of the chain 100 then causes the movement of the compression member 41 to be transmitted to the carriage causing inward movement of the latter until the rack 94 engages the upper run of the lower chain. Both chains then operate to convey the carriage through the tunnel. As previously stated, the inclined portions of the rails 30 and 31 are arranged in different planes, but the extremities of these rails are arranged in a single common plane and spaced apart a distance equal to the space between the axes of the rollers 46 and 47 whereby engagement between each set of rollers and its respective pair of rails takes place simultaneously. As the carriage continues to move inwardly, the slightly inclined portions of the rails 30 and 31 cause the compression member 41 to be gradually moved downwardly to effect vertical compression of the bale. The large rollers 58 of the lateral compression members then contact with the converging rails 29 whereby the lateral compression members are caused to move inwardly to further compress the bale. The bale compressing portions of the rails are slightly inclined and relatively long, and since movement of the carriage takes place very slowly, it will be apparent that there will be a very gradual compression of the bale, thus permitting air to freely escape therefrom, and a high degree of compression will be obtained. When the carriage reaches a point adjacent the center of the tunnel, the rollers 51 of the vertical compression member will engage the inclined portions 69 of the rails 68, whereupon continued inward movement of the carriage causes the member 41 to be elevated. It will be noted that the angle of inclination of the portion of the lower run of the chain 100 between the idler 105 and the sprocket 101 is greater than the angle of inclination of the rail portions 69, and accordingly the chain portion referred to will be gradually released from the rack 45 whereupon the upper compression member will cease to move longitudinally within the tunnel. This point in the operation of the vertical compression member takes place just after the rollers 51 have reached the horizontal part of the rails 68, and accordingly the vertical compression member will remain stationary. The high point 70' serves to prevent further movement of the carriage due to momentum thereof. When this stationary position is reached, the bottom of the member 41 will be arranged slightly above the support 42, but in the path of travel of the stop member 43. Thus the member 41 will remain stationary while the lower chain 88 continues to transmit movement to the carriage. The relative conditions of the member 41 and the carriage, just referred to, continue until the stop 43 contacts with the member 41, whereupon the latter will start to move with the carriage. Such movement of the member 41 causes the forward rollers 51 to pass over the high point 70' of the rails 68 whereupon both sets of rollers 51 move down the inclined portions 70 of the rails until the member 41 comes to rest upon the support 42. In actual practice it has been found that if a bale of cotton is first compressed in one direction and held under such compression while it is being compressed in a second direction, the initial compressing means may be released without any releasing of the initial compression. Accordingly the elevation of the vertical compression member does not release the vertical compression of the bale, and after the vertical compression member has assumed an inoperative position upon the support 42, as shown at the right hand side of Figure 5, operators may fasten the bale bands previously placed in position in the bale receiving member. These bands will be readily accessible through the top of the tunnel, as will be apparent. The carriage then continues to move toward the outlet end of the tunnel until the inner ends of the rails 71 and 72 contact with the rollers 62 and 64 of the lateral compression members, whereupon the rails referred to will cause the members 56 to be withdrawn from the bale receiving member. Any suitable means may be employed for securing the bale against longitudinal expansion. After the lateral compression members have been withdrawn in the manner referred to, the carriage is conveyed to a point adjacent the platform whereupon the crane 19 is utilized for removing the compressed bale. Removal of the bale may be facilitated by moving the auxiliary carriage 54 rearwardly. As previously stated, this carriage is maintained in operative position to permit lateral compression to take place, by the latch 107, and when it is desired to move the auxiliary carriage rearwardly, the latch 107 is manually released, whereupon the operator may push the auxiliary carriage rearwardly. Removal of the bale is facilitated by the slightly tapered construction of the walls 36 and 37 of the bale receiving member.

As previously stated, movement of the carriage through the tunnel takes place very slowly, but a firm and positive baling action is effected. The tunnel may be made of any suitable design adapted to withstand the internal pressure to which it is subjected, and any number of compression rails and rollers may be employed. The lower rails 33 are employed to supplement the traveling rails 10 in acting as supporting means while the vertical compressing action takes place.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a bale receiving member having an open top, supporting rails upon which said bale receiving member is adapted to travel, a relatively large compression member mounted adjacent the open top of said bale receiving member and movable thereinto to compress material therein, and a plurality of overhead inclined rails adapted to contact with said compression member at a plurality of points to effect movement thereof into said bale receiving member as the latter moves along said supporting rails, said rails lying in a plurality of planes whereby the sides of said compression member remain parallel to the side walls of said bale receiving member during movement of the latter.

2. Apparatus of the character described comprising horizontal supporting rails, a carriage mounted to travel upon said rails and including a bale receiving member having an open top, a relatively large compression member mounted adjacent the upper portion of said bale receiving member and movable downwardly thereinto to compress material therein, and overhead rails inclined downwardly with respect to said supporting rails and adapted to contact with said compression member at a plurality of points to effect movement thereof downwardly into said bale receiving member as said carriage travels along said supporting rails, said rails lying in a plurality of planes whereby the sides of said compression member remain parallel to the side walls of said bale receiving member during movement of the latter.

3. Apparatus of the character described comprising horizontal supporting rails, a carriage mounted to travel upon said rails and including a bale receiving member having an open top, a compression member mounted adjacent the upper portion of said bale receiving member and movable downwardly thereinto to compress material therein, an overhead rail inclined downwardly with respect to said supporting rails and adapted to contact with said compression member to effect movement thereof downwardly into said bale receiving member as said carriage travels along said supporting rails, and means for elevating said compression member from said bale receiving member and moving it longitudinally with respect thereto after said compression member passes beyond said overhead rail.

4. Apparatus of the character described comprising supporting rails, a carriage mounted to travel upon said rails, a bale receiving member forming a part of said carriage and provided with an open top and open sides, compression members movable into the open top and open sides of said carriage, and means for effecting movement of said compression members into said bale receiving member as said carriage moves along said rails.

5. Apparatus of the character described comprising supporting rails, a carriage mounted to travel upon said rails, a bale receiving member forming a part of said carriage and provided with an open top and open sides, compression members movable into the open top and open sides of said carriage, and compression transmitting rails mounted at a slight angle to said supporting rails and adapted to contact with said compression members to effect movement thereof into said bale receiving member as said carriage moves along said rails.

6. Apparatus of the character described comprising supporting rails, a carriage mounted to travel upon said rails, said carriage including a bale receiving member having an open top and open sides, compression members adapted to move into the open top and open sides of said bale receiving member to compress material therein, rollers mounted on the outer faces of said compression members, and side and overhead rails converging slightly with respect to said supporting rails, and adapted to contact with said rollers to effect movement of said compression members inwardly into said bale receiving member.

7. Apparatus constructed in accordance with claim 6 provided with means for withdrawing said compression members from said bale receiving member after said carriage passes beyond said side and overhead rails.

8. Apparatus constructed in accordance with claim 6 provided with means for conveying said carriage past said compression transmitting rails.

9. Apparatus constructed in accordance with claim 6 provided with a chain having a portion adapted to travel parallel to said supporting rails and adapted to engage a portion of said carriage to convey the latter along said supporting rails.

10. Apparatus constructed in accordance with claim 6 provided with auxiliary overhead rails adapted to engage a portion of the upper of said compression members to withdraw it from said bale receiving member as said carriage passes beyond said overhead rails and before it reaches the ends of said side rails.

11. Apparatus constructed in accordance with claim 6 provided with auxiliary overhead rails adapted to engage a portion of the upper of said compression members to withdraw it from said bale receiving member as said carriage passes beyond said overhead rails and before it reaches the ends of said rails, and auxiliary side rails adapted to withdraw the side compression members from said bale receiving member.

12. Apparatus of the character described comprising supporting rails, a carriage mounted to travel upon said rails, an endless chain having a portion arranged parallel to said supporting rails and adapted to engage a portion of said carriage to effect movement thereof along said supporting rails, a bale receiving member forming a part of said carriage and having an open top, a horizontal support carried by said bale receiving member at the upper end thereof, a compression member movable downwardly into said bale receiving member to compress material therein, said compression member being adapted to be moved upwardly from said bale receiving member and to an inoperative position on said support, overhead compression transmitting means adapted to contact with said compression member to effect downward movement thereof into said bale receiving member as said carriage travels along said rails, and means for moving said compression member from inoperative position to a position over said bale receiving member before said compression member contacts with said compression transmitting means.

13. Apparatus constructed in accordance with claim 12 provided with means for causing said compression member to be lifted and moved horizontally to inoperative position after said carriage passes beyond said compression transmitting means.

14. Apparatus of the character described comprising supporting rails, a carriage mounted to travel upon said rails, an endless chain having a portion arranged parallel to said supporting rails and adapted to engage a portion of said carriage to effect movement thereof along said rails, a bale receiving member forming a part of said carriage and provided with an open top and open sides, a vertical compression member movable downwardly into the upper end of said bale receiving member, a support carried by said bale receiving member and arranged at the upper end thereof, said vertical compression member being adapted to be withdrawn from said bale receiving member and moved horizontally to an inoperative position on said support, lateral compression members movable into the open sides of said bale receiving member, means for effecting inward movement of said compression members as said carriage moves along said rails, means for causing said vertical compression member to be withdrawn from said bale receiving member and moved to inoperative position after said carriage passes beyond the means for effecting inward movement of said compression members, and means for withdrawing said lateral compression members after said vertical compression member has been moved to inoperative position.

15. Apparatus of the character described comprising a tunnel, supporting rails extending through said tunnel at the lower portion thereof, a carriage adapted to travel upon said supporting rails, a bale receiving member forming a part of said carriage and having an open top and open sides, a vertical compression member movable downwardly into the top of said bale receiving member, lateral compression members movable into the open sides of said bale receiving member, and compression transmitting means arranged in said tunnel and adapted to effect movement of said compression members into said bale receiving member.

16. Apparatus of the character described comprising a tunnel, supporting rails extending through said tunnel at the lower portion thereof, a carriage adapted to travel upon said supporting rails, a bale receiving member forming a part of said carriage and having an open top and open sides, a vertical compression member movable downwardly into the top of said bale receiving member, lateral compression members movable into the open sides of said bale receiving member, and compression transmitting rails arranged in said tunnel and inclined slightly with respect to said supporting rails, said compression transmitting rails being adapted to contact with said compression members to effect inward movement thereof as said carriage travels through said tunnel.

17. Apparatus of the character described comprising a tunnel, supporting rails extending through said tunnel at the lower portion thereof, a carriage adapted to travel upon said supporting rails, a bale receiving member forming a part of said carriage and having an open top and open sides, a vertical compression member movable downwardly into the top of said bale receiving member, lateral compression members movable into the open sides of said bale receiving member, compression transmitting rails arranged in said tunnel and inclined slightly with respect to said supporting rails, said compression transmitting rails being adapted to contact with said compression members to effect inward movement thereof as said carriage travels through said tunnel, and means for withdrawing said compression members from said bale receiving member after said carriage passes beyond said compression transmitting rails.

18. Apparatus of the character described comprising a tunnel, supporting rails extending through said tunnel adjacent the bottom thereof, a carriage adapted to travel upon said rails, a bale receiving member forming a part of said carriage and having an open top and open sides, a vertical compression member movable downwardly into the top of said bale receiving member, lateral compression members movable into the sides of said bale receiving member, rollers carried by the outer faces of said compression members, compression transmitting rails carried by said tunnel adjacent the top thereof and inclined downwardly toward said supporting rails, and compression transmitting rails arranged adjacent the side walls of said tunnel and converging toward each other, said compression transmitting rails being adapted to contact with said rollers to effect inward movement of said compression members as said carriage moves through said tunnel.

19. Apparatus of the character described comprising a tunnel, supporting rails extending through said tunnel adjacent the bottom thereof, a carriage adapted to travel upon said rails, a bale receiving member forming a part of said carriage and having an open top and open sides, a vertical compression member movable downwardly into the top of said bale receiving member, lateral compression members movable into the sides of said bale receiving member, rollers carried by the outer faces of said compression members, compression transmitting rails carried by said tunnel adjacent the top thereof and inclined downwardly toward said supporting rails, compression transmitting rails arranged adjacent the side walls of said tunnel and converging toward each other, said compression transmitting rails being adapted to contact with said rollers to effect inward movement of said compression members as said carriage moves through said tunnel, and means for conveying said carriage through said tunnel.

20. Apparatus of the character described comprising a tunnel, supporting rails extending through said tunnel adjacent the bottom thereof, a carriage adapted to travel upon said rails, a bale receiving member forming a part of said carriage and having an open top and open sides, a vertical compression member movable downwardly into the top of said bale receiving member, lateral compression members movable into the sides of said bale receiving member, rollers carried by the outer faces of said compression members, compression transmitting rails carried by said tunnel adjacent the top thereof and inclined downwardly toward said supporting rails, compression transmitting rails arranged adjacent the side walls of said tunnel and converging toward each other, said compression transmitting rails being adapted to contact with said rollers to effect inward movement of said compression members as said carriage moves through said tunnel, and an endless chain having a portion extending through said tunnel adjacent and parallel to said rails and adapted to engage a portion of said carriage to convey the latter through said tunnel.

21. Apparatus of the character described comprising a bale receiving member having an open portion therein, a compression member movable into the open portion of said bale receiving member to compress material therein, compression transmitting means adapted to move said compression member and said bale receiving member relatively with respect to each other to effect compression of material within said bale receiving member, and means for withdrawing said compression member and moving it to a point out of alinement with the open portion of said bale receiving member after the compressing action has been completed.

22. Apparatus of the character described comprising a bale receiving member having an open portion therein, means for supporting said bale receiving member for substantially linear movement, a compression member movable into said bale receiving member through the open portion thereof, means inclined with respect to said supporting means for effecting movement of said compression member into said bale receiving member, and means for withdrawing said compression member and moving it out of alinement with the open portion of said bale receiving member upon completion of the compressing action.

23. Apparatus of the character described comprising a bale receiving member having an open portion therein, a compression member movable into said bale receiving member through said open portion, means for supporting said bale receiving member for linear movement, means engageable with respect to said supporting means for effecting movement of said compression member into said bale receiving member during linear movement of said bale receiving member, said compression member being adapted initially to assume a position externally of said bale receiving member and out of alinement with the open portion therein, and means for effecting linear movement of said bale receiving member, said last named means being adapted to initially engage said compression member and move it to a position in alinement with the open portion of said bale receiving member.

24. Apparatus of the character described comprising a bale receiving member having an open top and a support arranged at its upper portion substantially in horizontal alinement with said open top, means for supporting said bale receiving member for linear movement, a compression member movable downwardly into said bale receiving member through the open top thereof, and adapted to assume an initial position on said support, means for effecting movement of said compression member from said support to a position in vertical alinement with the open top of said bale receiving member, and means inclined with respect to said supporting means for effecting downward movement of said compression member during linear movement of said bale receiving member.

25. Apparatus of the character described comprising a bale receiving member having an open side, a compression member movable into the open side of said bale receiving member when in alinement therewith, a carriage for supporting said compression member and adapted to move the latter to positions in and out of alinement with the open side of said bale receiving member, means for latching said carriage in a position with said compression member in alinement with the open side of said bale receiving member, means for supporting said bale receiving member for linear movement, and means inclined with respect to said supporting means for effecting movement of said compression member into said bale receiving member during linear movement thereof.

In testimony whereof I affix my signature.

VÄINÖ HERMAN POHJONEN.